(12) United States Patent
Adsumilli et al.

(10) Patent No.: US 9,940,697 B2
(45) Date of Patent: Apr. 10, 2018

(54) SYSTEMS AND METHODS FOR COMBINED PIPELINE PROCESSING OF PANORAMIC IMAGES

(71) Applicant: GoPro, Inc., Carlsbad, CA (US)

(72) Inventors: Balineedu Chowdary Adsumilli, San Francisco, CA (US); Adeel Abbas, Carlsbad, CA (US); David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/347,610

(22) Filed: Nov. 9, 2016

(65) Prior Publication Data

US 2017/0301065 A1    Oct. 19, 2017

Related U.S. Application Data

(60) Provisional application No. 62/323,562, filed on Apr. 15, 2016.

(51) Int. Cl.

| G06T 5/00 | (2006.01) |
|---|---|
| G06T 3/00 | (2006.01) |
| G06T 5/20 | (2006.01) |
| G06T 3/40 | (2006.01) |

(52) U.S. Cl.
CPC ............ *G06T 5/001* (2013.01); *G06T 3/0093* (2013.01); *G06T 3/4038* (2013.01); *G06T 5/20* (2013.01)

(58) Field of Classification Search
CPC ..... G06T 3/0093; G06T 3/4038; G06T 5/001; G06T 5/20
See application file for complete search history.

(56) References Cited

U.S. PATENT DOCUMENTS

| 8,606,073 | B2 | 12/2013 | Woodman |  |
|---|---|---|---|---|
| 9,171,577 | B1* | 10/2015 | Newman | .............. G11B 27/031 |
| 9,575,803 | B2 | 2/2017 | Chauvet et al. |  |
| 2003/0007567 | A1 | 1/2003 | Newman et al. |  |
| 2009/0154559 | A1* | 6/2009 | Gardner | ............. H04N 21/2381 |
|  |  |  |  | 375/240.14 |

(Continued)

OTHER PUBLICATIONS

Achanta R., et al., "Slic Superpixels Compared to State-of-The-Art Superpixel Methods," IEEE Transactions on Pattern Analysis and Machine Intelligence, 2012, vol. 34 (11), pp. 2274-2282.

(Continued)

*Primary Examiner* — Stephen R Koziol
*Assistant Examiner* — Shaghayegh Azima
(74) *Attorney, Agent, or Firm* — Gazdzinski & Associates, PC

(57) ABSTRACT

Systems and methods for capturing and/or processing of panoramic imaging content using spatial redundancy-based mapping. Panoramic imaging content may be processed using a processing pipeline that may operate on a portion of the image. Images may be transformed prior to processing. Image transformation may introduce distortion and/or data redundancy. Image partitioning for the pipeline processing may be configured based on spatial redundancy associated with the transformation. Windowing operation may include partitioning an image using non-rectangular and/or non-equal windows.

20 Claims, 8 Drawing Sheets

(56) References Cited

U.S. PATENT DOCUMENTS

| | | | |
|---|---|---|---|
| 2009/0249393 A1* | 10/2009 | Shelton | H04N 5/445 725/39 |
| 2015/0269736 A1* | 9/2015 | Hannuksela | G06T 7/0059 345/419 |
| 2016/0274338 A1 | 9/2016 | Davies et al. | |

OTHER PUBLICATIONS

Allène C., et al., "Seamless Image-based Texture Atlases Using Multi-band Blending," Pattern Recognition, 2008. ICPR 2008. 19th International Conference on, 2008.

Ambisonics such as described at http://www.ambisonic.net/.

Ambisonics such as described at http://www.digitalbrainstorming.ch/db_data/eve%20/ambisonics/text01.pdf.

Badrinarayanan V., et al., "Segnet: a Deep Convolutional Encoder-Decoder Architecture for Image Segmentation," arXiv preprint arXiv:1511.00561, 2015.

Barghout L. and Sheynin J., "Real-world scene perception and perceptual organization: Lessons from Computer Vision". Journal of Vision, 2013, vol. 13 (9). (Abstract).

Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.

Bay H., et al., "Surf: Speeded up Robust Features," European Conference on Computer Vision, Springer Berlin Heidelberg, 2006, pp. 404-417.

Beier et al., "Feature-Based Image Metamorphosis," in Computer Graphics Journal, Jul. 1992, vol. 26 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

Burt et al., "A Multiresolution Spline with Application to Image Mosaics," in ACM Transactions on Graphics (TOG), 1983, vol. 2, No. 4, pp. 217-236.

Chan T.F. and Vese LA., "Active contours without edges". IEEE Transactions on Image Processing, 2001, 10 (2), pp. 266-277 (hereinafter "Chan").

Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.

Elen R., "Whatever happened to Ambisonics" AudioMedia Magazine, Nov. 1991.

Gracias N., et al., "Fast Image Blending Using Watersheds and Graph Cuts," Image and Vision Computing, 2009, vol. 27 (5), pp. 597-607.

Herbst E., et al., "Occlusion Reasoning for Temporal Interpolation Using Optical Flow," Department of Computer Science and Engineering, University of Washington, Tech. Rep. UW-CSE-09-08-01, 2009.

High Efficiency Video Coding (HEVC), also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015.

ITU-T H.264 (Jan. 2012) and/or ISO/IEC 14496-10:2012, Information technology—Coding of audio-visual objects—Part 10: Advanced Video Coding.

Jakubowski M., et al., "Block-based motion estimation algorithms—a survey," Opto-Electronics Review 21, No. 1 (2013), pp. 86-102.

Kendall A., et al., "Bayesian Segnet: Model Uncertainty in Deep Convolutional Encoder-Decoder Architectures for Scene Understanding," arXiv preprint arXiv:1511.02680, 2015.

Lowe D.G., "Object Recognition From Local Scale-invariant Features," Computer vision, The proceedings of the seventh IEEE international conference on 1999, vol. 2, pp. 1150-1157.

Mitzel D., et al., "Video Super Resolution Using Duality Based TV-l 1 Optical Flow," Joint Pattern Recognition Symposium, 2009, pp. 432-441.

Pérez et al., "Poisson Image Editing," in ACM Transactions on Graphics (TOG), 2003, vol. 22, No. 3, pp. 313-318.

Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.

Schwartz, E., et al., "Implementation of Compression with Reversible Embedded Wavelets," in Proc. SPIE, 1995, 12 pages.

Suzuki et al., "Inter Frame Coding with Template Matching Averaging," in IEEE International Conference on Image Processing Proceedings (2007), vol. (III), pp. 409-412.

Szeliski R., "Computer vision: algorithms and applications," Springer Science & Business Media, 2010.

Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.

Vass, J., et al., "Efficient Three-Dimensional Wavelet Codecs for Networked Video Communication," in Proceedings of IEEE International Conference on Image Processing, Kobe, Japan, Oct. 1999, pp. 565-569.

VP9 video codec (described at http://www.webmproject.org/vp9).

Xiao J., and Quan L., "Multiple View Semantic Segmentation for Street View Images," 2009 IEEE 12th International Conference on Computer Vision, 2009, pp. 686-693.

Xiong Y., et al., "Gradient Domain Image Blending and Implementation on Mobile Devices," International Conference on Mobile Computing, Applications, and Services, Springer Berlin Heidelberg, 2009, pp. 293-306.

Zhai et al., "A Low Complexity Motion Compensated Frame Interpolation Method," in IEEE International Symposium on Circuits and Systems (2005), pp. 4927-4930.

Zhang., "A Flexible New Technique for Camera Calibration" IEEE Transactions, dated Nov. 2000, vol. 22, No. 11, pp. 1330-1334.

\* cited by examiner

Spherical  
(r, θ, Φ)

Equirectangular  
(x, y)

Processing Pipeline
660

662 Vignette compensation
663 Lens warp corrections
664 Local exposure modification
665 Digital WB and/or gain
666 Noise reduction filters
668 Global and/or local tone mapping
670 Chroma and Luma sub-sampling and/or scaling
672 Sharpening filters
673 Noise-reduction filters
674 Edge filters
676 Temporal noise filtering (motion compensated)
678 Input parameters for the compression engine.

FIG. 6C

SYSTEMS AND METHODS FOR COMBINED PIPELINE PROCESSING OF PANORAMIC IMAGES

PRIORITY

This application claims the benefit of priority to U.S. Provisional Patent Application Ser. No. 62/323,562 filed Apr. 15, 2016 of the same title, the contents of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to storing and/or presenting of image and/or video content and more particularly in one exemplary aspect to processing of panoramic images.

Description of Related Art

Virtual reality (VR) video content and/or panoramic video content may include bitstreams characterized by high resolution and data rates (e.g., 8192×4096 at 60 frames per second in excess of 100 megabits per second (mbps)). Users may be viewing high data rate content on a resource limited device (e.g., battery operated computer (e.g., a tablet, a smartphone)) and/or other device that may be characterized by a given amount of available energy, data transmission bandwidth, and/or computational capacity. Resources available to such resource limited device may prove inadequate for receiving and/or decoding full resolution and/or full frame image content.

SUMMARY

The present disclosure satisfies the foregoing needs by providing, inter alia, methods and apparatus for provision of captured content in a manner that addresses the processing capabilities of a resource limited device.

In a first aspect, a computerized apparatus is disclosed. In one embodiment, the computerized apparatus includes: a network interface configured to receive a plurality of source images; an image transformation component configured to transform one or more of the source images from a source representation to a target representation in order to obtain a transformed image; a windowing component configured to receive a spatial information redundancy distribution from the image transformation component, the spatial information redundancy distribution associated with the transformation from the source representation to the target representation, the windowing component further configured to generate a plurality of windows for the transformed image, the generated windows being based at least in part on the spatial information redundancy distribution; and a processing component configured to apply one or more processing operations on the transformed image on a window by window basis of the plurality of generated windows.

In one variant, the processing component is further configured to select first pixels of the transformed image corresponding to the first window; and apply at least one pixel manipulation operation so as to modify a value of one or more pixels of the first pixels based on an evaluation of the first pixels of the transformed image corresponding to the first window.

In another variant, the applied at least one pixel manipulation operation is selected from the group consisting of: a Vignetted compensation, a lens warp correction, a local exposure modification, a digital white balance and/or gain operation, a noise reduction filter operation, a global and/or local tone mapping operation, a Chroma and Luma sub-sampling and/or scaling operation, a sharpening filter operation, a noise-reduction filter operation, an edge filter operation, a temporal noise filtering operation, and a determination of input parameters for a compression engine.

In yet another variant, the source representation includes a lens-specific natively captured representation and the target representation includes an equirectangular projection.

In yet another variant, the spatial information redundancy distribution is configured based on a spatial distortion characteristic associated with the transformation of the one or more of the source images from the source representation to the target representation.

In yet another variant, the processing component is further configured to: generate a processed image based at least in part on the applied one or more processing operations on the transformed image; and transmit the processed image to a target destination.

In a second aspect, a system for processing images is disclosed. In one embodiment, the system includes: an electronic storage configured to store a plurality of source images; and one or more physical processors configured to execute a plurality of computer readable instructions, the plurality of computer readable instructions when executed by the one or more physical processors is configured to: transform one or more of the source images from a source representation to a target representation to obtain a transformed image; obtain a spatial information redundancy distribution associated with the transformation from the source representation to the target representation; obtain an image partition map based on the spatial information redundancy distribution, the image partition map including a first window and a second window; select first pixels of the transformed image corresponding to the first window; and apply at least one pixel manipulation operation configured to modify a value of one or more pixels of the first pixels based on an evaluation of the first pixels of the transformed image corresponding to the first window.

In one variant, the dimensions of the first window are different from dimensions of the second window so that an area of the first window exceeds an area of the second window.

In another variant, the source representation includes a lens-specific natively captured representation.

In yet another variant, the transformed image includes an equirectangular projection.

In yet another variant, the spatial information redundancy distribution is configured based on a spatial distortion characteristic of the transformation.

In yet another variant, the plurality of computer readable instructions when executed by the one or more physical processors is further configured to: select second pixels of the transformed image corresponding to the second window;

and apply at least one pixel manipulation operation configured to modify a value of one or more pixels of the second pixels based on an evaluation of the second pixels of the transformed image corresponding to the second window.

In yet another variant, the plurality of computer readable instructions when executed by the one or more physical processors is further configured to apply the at least one pixel manipulation operation on a window by window basis, such that the at least one pixel manipulation operation is performed on the first window independently from the at least one pixel manipulation operation performed on the second window.

In yet another variant, the plurality of computer readable instructions when executed by the one or more physical processors is further configured to: generate a processed image based at least in part on the applied at least one pixel manipulation operation; and store the processed image in the electronic storage.

In yet another variant, the plurality of computer readable instructions when executed by the one or more physical processors is further configured to transmit the stored processed image to a target destination.

In yet another variant, the applied at least one pixel manipulation operation is selected from the group consisting of: a Vignetted compensation, a lens warp correction, a local exposure modification, a digital white balance and/or gain operation, a noise reduction filter operation, a global and/or local tone mapping operation, a Chroma and Luma sub-sampling and/or scaling operation, a sharpening filter operation, a noise-reduction filter operation, an edge filter operation, a temporal noise filtering operation, and a determination of input parameters for a compression engine.

In a third aspect, a method for processing images is disclosed. In one embodiment, the method includes: transforming one or more source images from a source representation to a target representation in order to obtain a transformed image; obtaining a spatial information redundancy distribution associated with the transformation from the source representation to the target representation; obtaining an image partition map based on the spatial information redundancy distribution, the image partition map comprising a first window of the transformed image; selecting first pixels of the transformed image corresponding to the first window; and applying at least one pixel manipulation operation configured to modify a value of one or more pixels of the first pixels based on an evaluation of the first pixels of the transformed image corresponding to the first window.

In one variant, the method further includes selecting second pixels of the transformed image corresponding to a second window of the transformed image, the second window differing in size from the first window; and applying at least one pixel manipulation operation configured to modify a value of one or more pixels of the second pixels based on an evaluation of the second pixels of the transformed image corresponding to the second window.

In another variant, the method further includes applying the at least one pixel manipulation operation on a window by window basis, such that the at least one pixel manipulation operation is performed on the first window independently from the at least one pixel manipulation operation performed on the second window.

In yet another variant, the method further includes: generating a processed image based at least in part on the applied at least one pixel manipulation operation; and storing the processed image in an electronic storage.

In yet another variant, the method further includes transmitting the stored processed image to a target destination.

In a fourth aspect, a computer readable storage apparatus is disclosed. In one embodiment, the computer readable storage apparatus includes computer readable instructions, the computer readable instructions when executed by one or more physical processors is configured to: transform one or more of the source images from a source representation to a target representation to obtain a transformed image; obtain a spatial information redundancy distribution associated with the transformation from the source representation to the target representation; obtain an image partition map based on the spatial information redundancy distribution, the image partition map including a first window and a second window; select first pixels of the transformed image corresponding to the first window; and apply at least one pixel manipulation operation configured to modify a value of one or more pixels of the first pixels based on an evaluation of the first pixels of the transformed image corresponding to the first window.

In a fifth aspect, an integrated circuit (IC) apparatus is disclosed. In one embodiment, the IC apparatus includes logic configured to: transform one or more of the source images from a source representation to a target representation to obtain a transformed image; obtain a spatial information redundancy distribution associated with the transformation from the source representation to the target representation; obtain an image partition map based on the spatial information redundancy distribution, the image partition map including a first window and a second window; select first pixels of the transformed image corresponding to the first window; and apply at least one pixel manipulation operation configured to modify a value of one or more pixels of the first pixels based on an evaluation of the first pixels of the transformed image corresponding to the first window.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

FIG. 6C illustrates an image processing component for use with, e.g., the apparatus of FIG. 6B for processing panoramic content using spatial redundancy-based mapping methodology in accordance with the principles of the present disclosure.

Figure 1A:
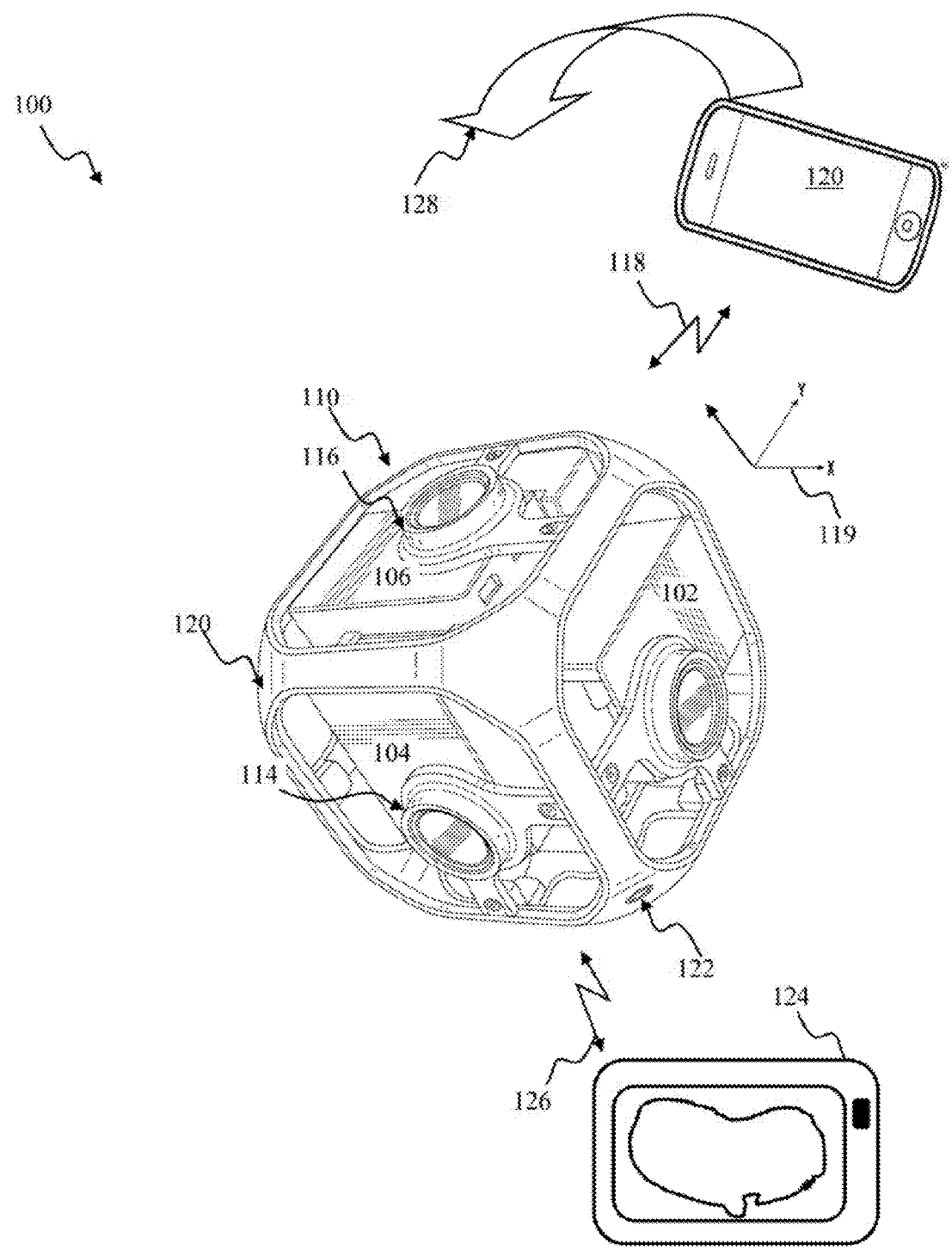
FIG. 1A is a functional block diagram illustrating a system for content capture and viewing in accordance with the principles of the present disclosure.

All Figures disclosed herein are © Copyright 2016 GoPro Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Systems and methods for processing panoramic imaging content using spatial mapping are provided.

Panoramic content (e.g., content captured using 180 degree, 360-degree view field and/or other fields of view) and/or virtual reality (VR) content, may be characterized by high image resolution (e.g., 8192 pixels by 4096 pixels (8K)) and/or high bit rates (e.g., up to 100 megabits per second (mbps)). Imaging content characterized by full circle coverage (e.g., 180°×360° field of view) may be referred to as spherical content. Presently available standard video compression codecs, e.g., H.264 (described in ITU-T H.264 (01/2012) and/or ISO/IEC 14496-10:2012, Information technology—Coding of audio-visual objects—Part 10: Advanced Video Coding, each of the foregoing incorporated herein by reference in its entirety), High Efficiency Video Coding (HEVC), also known as H.265, described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, each of the foregoing incorporated herein by reference in its entirety, and/or VP9 video codec, described at e.g., http://www.webmproject.org/vp9, the foregoing incorporated herein by reference in its entirety, may prove non-optimal for providing panoramic content to resource limited devices.

When viewing panoramic and/or VR content using a viewport, the server may send (and the decoder may decode) a portion of high resolution video. The area where the user is looking may be in high resolution and rest of the image may be in low resolution. When the viewer moves his/her viewport, the decoder may ask the server to transmit video data corresponding to updated viewpoint. Using methodologies of the present disclosure, the server may transmit new high fidelity content for the new viewport position. The decoder may use existing (buffered) lower fidelity content and combine it with the new high fidelity content. Such approach may alleviate the need of transmitting one or more high fidelity intra frames, reduce network congestion, and/or reduce energy use by the decoding device.

Panoramic, and/or virtual reality content may be viewed by a client device using a viewport into the extent of the panoramic image. In some implementations, viewing dimension(s) of the viewport may be configured smaller than the extent dimension(s) of the content (e.g., a viewport covering 1024 pixel wide by 1024 pixel in height area may be used to view content that was obtained over area 8192 pixels in width and 4096 pixels in height). Client device may include a portable media device characterized by given energy and/or computational resources.

Video content may be encoded using spatially varying encoding quality distribution (quality mapping). Spherical content may be obtained by a capture device characterized by multiple optical elements and/or image sensors (e.g., multi-camera device of FIG. 1A). One or more images (and/or portions thereof) obtained by individual cameras may be combined using a transformation operation. In some implementations, the transformation may include transformation from camera lens coordinates (e.g., fish-eye lens) to planar coordinates (e.g., equirectangular coordinates), e.g., to obtain equirectangular panorama. In the imaging arts, an equirectangular projection may be used to for mapping a portion of the surface of a sphere to a planar surface. In some implementations, the Cubic Projection may be used to transform source images.

In some implementations an equirectangular projection may be used. In an equirectangular panoramic image, vertical elements may remain vertical; the horizon may become a straight line across the middle of the image. Coordinates in the image may relate linearly to pan and tilt angles in the spherical coordinates. The poles (Zenith, Nadir) are located at the top and bottom edge and may be stretched to the entire width of the image. Areas near the poles may be stretched horizontally. Longitudinal distortion of the transformation may be used for encoding panoramic images. When encoding images characterized by spatially varying distortion, spatially varying encoding quality may be utilized. By way of a non-limiting example, image portion near the equator (e.g., middle of latitudinal dimension of the image) may be characterized by lower distortion compared to image portion away from the equator (e.g., proximate poles). During encoding, image portions (e.g., macroblocks) proximate equator, may be encoded using one quality parameter; image portions (e.g., macroblocks) proximate poles, may be encoded using another quality parameter. In some implementations, quality parameter configuration may include modifications of quantization parameter (QP). In one or more implementations of encoding, QP may be varying in accordance with distance of a position of a given from the equator. Content delivery methodology of the present disclosure may be utilized for facilitating virtual reality (VR) content delivery, video conferencing, immersive experience when viewing spherical (e.g., 360 degree content), and/or other applications.

When processing images characterized by spatially varying distortion, spatially varying mapping may be utilized. By way of a non-limiting example, an image portion near the equator (e.g., middle of latitudinal dimension of the image) may be characterized by lower distortion compared to an image portion away from the equator (e.g., proximate poles). During block processing of an image (e.g., processing a block of pixels), image portions proximate equator may be processed using smaller blocks; image portions proximate one or more poles may be processed using larger blocks.

FIG. 1A illustrates a capture system configured for acquiring panoramic content, in accordance with one implementation. The system 100 of FIG. 1A may include a capture apparatus 110, e.g., such as GoPro action camera, e.g., HERO4 Silver, and/or other image/video capture devices.

The capture apparatus 110 may include 6-cameras (e.g., 104, 106, 102) disposed in a cube-shaped cage 120. The cage 120 dimensions may be selected between 25 mm and 150 mm, preferably 105 mm in some implementations. The cage 120 may be outfitted with a mounting port 122 configured to enable attachment of the camera to a supporting structure (e.g., tripod, photo stick). The cage 120 may provide a rigid support structure. Use of a rigid structure may ensure that orientation of individual cameras with respect to one another may remain at a given configuration during operation of the apparatus 110.

Individual capture devices (e.g., 102) may comprise a video camera device, such as described in, e.g., such as described in U.S. patent application Ser. No. 14/920,427 entitled "APPARATUS AND METHODS FOR EMBEDDING METADATA INTO VIDEO STREAM" filed on 22 Oct. 2015, the foregoing being incorporated herein by reference in its entirety.

In some implementations, the capture device may include two camera components (including a lens and imaging sensors) that are disposed in a Janus configuration, e.g., back to back such as described in U.S. patent application Ser. No. 29/548,661, entitled "MULTI-LENS CAMERA" filed on 15 Dec. 2015, the foregoing being incorporated herein by reference in its entirety.

The capture apparatus 110 may be configured to obtain imaging content (e.g., images and/or video) with 360° field of view, also referred to as panoramic or spherical content, e.g., such as shown and described in U.S. patent application Ser. No. 14/949,786, entitled "APPARATUS AND METHODS FOR IMAGE ALIGNMENT" filed on 23 Nov. 2015, and/or U.S. patent application Ser. No. 14/927,343, entitled "APPARATUS AND METHODS FOR ROLLING SHUTTER COMPENSATION FOR MULTI-CAMERA SYSTEMS", filed 29 Oct. 2015, each of the foregoing being incorporated herein by reference in its entirety.

Individual cameras (e.g., 102, 104, 106) may be characterized by field of view 120° in longitudinal dimension and 60° in latitudinal dimension. In order to provide for an increased overlap between images obtained with adjacent cameras, image sensors of any two adjacent cameras may be configured at 60° with respect to one another. By way of non-limiting illustration, longitudinal dimension of camera 102 sensor may be oriented at 60° with respect to longitudinal dimension of the camera 104 sensor; longitudinal dimension of camera 106 sensor may be oriented at 60° with respect to longitudinal dimension 116 of the camera 104 sensor. Camera sensor configuration illustrated in FIG. 1A, may provide for 420° angular coverage in vertical and/or horizontal planes. Overlap between fields of view of adjacent cameras may provide for an improved alignment and/or stitching of multiple source images to produce, e.g., a panoramic image, particularly when source images may be obtained with a moving capture device (e.g., rotating camera).

Individual cameras of the apparatus 110 may comprise a lens e.g., lens 114 of the camera 104, lens 116 of the camera 106. In some implementations, the individual lens may be characterized by what is referred to as fish-eye pattern and produce images characterized by fish-eye (or near-fish-eye) field of view (FOV). Images captured by two or more individual cameras of the apparatus 110 may be combined using stitching of fish-eye projections of captured images to produce an equirectangular planar image, in some implementations, e.g., such as shown in U.S. patent application Ser. No. 14/920,427 entitled "APPARATUS AND METHODS FOR EMBEDDING METADATA INTO VIDEO STREAM" filed on 22 Oct. 2015, incorporated supra.

The capture apparatus 110 may house one or more internal metadata sources, e.g., video, inertial measurement unit, global positioning system (GPS) receiver component and/or other metadata source. In some implementations, the capture apparatus 110 may comprise a device described in detail in U.S. patent application Ser. No. 14/920,427, entitled "APPARATUS AND METHODS FOR EMBEDDING METADATA INTO VIDEO STREAM" filed on 22 Oct. 2015, incorporated supra. The capture apparatus 110 may comprise one or optical elements 102. Individual optical elements 116 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fish-eye lens, infrared lens, ultraviolet lens, perspective control lens, other lens, and/or other optical element(s).

The capture apparatus 110 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensor. The capture apparatus 110 may include one or more microphones configured to provide audio information that may be associated with images being acquired by the image sensor.

The capture apparatus 110 may be interfaced to an external metadata source 124 (e.g., GPS receiver, cycling computer, metadata puck, and/or other device configured to provide information related to system 100 and/or its environment) via a remote link 126. The capture apparatus 110 may interface to an external user interface device 120 via the link 118. In some implementations, the device 120 may correspond to a smartphone, a tablet computer, a phablet, a smart watch, a portable computer, and/or other device configured to receive user input and communicate information with the camera capture device 110. In some implementations, the capture apparatus 110 may be configured to provide panoramic content (or portion thereof) to the device 120 for viewing.

In one or more implementations, individual links 126, 118 may utilize any practical wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, individual links 126, 118 may be effectuated using a wired interface, e.g., HDMI, USB, digital video interface, display port interface (e.g., digital display interface developed by the Video Electronics Standards Association (VESA), Ethernet, Thunderbolt), and/or other interface.

In some implementations (not shown) one or more external metadata devices may interface to the apparatus 110 via a wired link, e.g., HDMI, USB, coaxial audio, and/or other interface. In one or more implementations, the capture apparatus 110 may house one or more sensors (e.g., GPS, pressure, temperature, heart rate, and/or other sensors). The metadata obtained by the capture apparatus 110 may be incorporated into the combined multimedia stream using any applicable methodologies including those described in U.S. patent application Ser. No. 14/920,427 entitled "APPARATUS AND METHODS FOR EMBEDDING METADATA INTO VIDEO STREAM" filed on 22 Oct. 2015, incorporated supra.

The user interface device 120 may operate a software application (e.g., GoPro Studio, GoPro App, and/or other application) configured to perform a variety of operations related to camera configuration, control of video acquisition, and/or display of video captured by the camera apparatus 110. An application (e.g., GoPro App) may enable a user to create short video clips and share clips to a cloud service (e.g., Instagram, Facebook, YouTube, Dropbox); perform full remote control of camera 110 functions, live preview video being captured for shot framing, mark key moments while recording with HiLight Tag, View HiLight Tags in GoPro Camera Roll for location and/or playback of video highlights, wirelessly control camera software, and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of an illustration, the device 120 may receive user setting characterizing image resolution (e.g., 3840 pixels by 2160 pixels), frame rate (e.g., 60 frames per second (fps)), and/or other settings (e.g., location) related to the activity (e.g., mountain biking) being captured. The user interface device 120 may communicate the settings to the camera apparatus 110.

A user may utilize the device 120 to view content acquired by the capture apparatus 110. Display of the device 120 may act as a viewport into 3D space of the panoramic content. In some implementations, the user interface device 120 may communicate additional information (e.g., metadata) to the camera apparatus 110. By way of an illustration, the device 120 may provide orientation of the device 120 with respect to a given coordinate system, to the apparatus 110 so as to enable determination of a viewport location and/or dimensions for viewing of a portion of the panoramic content. By way of an illustration, a user may rotate (e.g., sweep) the device 120 through an arc in space (as illustrated by arrow 128 in FIG. 1A). The device 120 may communicate display orientation information to the capture apparatus 110. The capture apparatus 110 may provide an encoded bitstream configured to enable viewing of a portion of the panoramic content corresponding to a portion of the environment of the display location as it traverses the path 128.

The capture apparatus 110 may include a display configured to provide information related to camera operation mode (e.g., image resolution, frame rate, capture mode (sensor, video, photo), connection status (connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable user to start, stop, pause, resume sensor and/or content capture. User commands may be encoded using a variety of approaches including but not limited to duration of button press (pulse width modulation), number of button presses (pulse code modulation) and/or a combination thereof. By way of an illustration, two short button presses may initiate sensor acquisition mode described in detail elsewhere; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

Figure 1B:
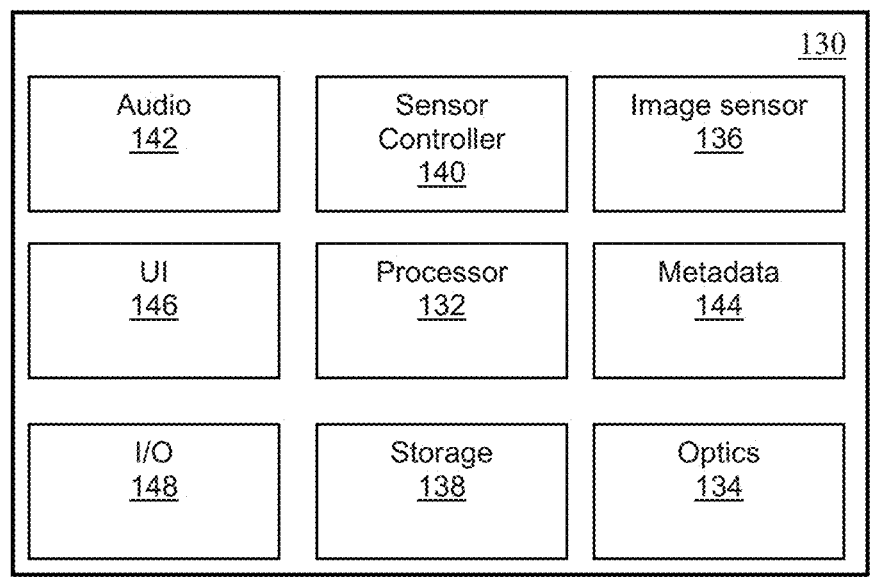
FIG. 1B is a functional block diagram illustrating a capture device for use with, for example, the system of FIG. 1A in accordance with the principles of the present disclosure.

FIG. 1B illustrates one implementation of a camera apparatus for collecting metadata and content. The apparatus of FIG. 1B may comprise a capture device 130 that may include one or more processors 132 (such as system on a chip (SOC), microcontroller, microprocessor, CPU, DSP, ASIC, GPU, and/or other processors) that control the operation and functionality of the capture device 130. In some implementations, the capture device 130 in FIG. 1B may correspond to an action camera configured to capture photo, video and/or audio content.

The capture device 130 may include an optics module 134. In one or more implementations, the optics module 134 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fish-eye lens, infrared lens, ultraviolet lens, perspective control lens, other lens, and/or other optics component(s). In some implementations the optics module 134 may implement focus controller functionality configured to control the operation and configuration of the camera lens. The optics module 134 may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxide-semiconductor sensor, and/or other image sensor. The image sensor 136 may be configured to capture light waves gathered by the optics module 134 and to produce image(s) data based on control signals from the sensor controller module 140. Optics module 134 may comprise focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 136 may include, without limitation, video sensors, audio sensors, capacitive sensors, radio sensor, vibrational sensor, ultrasonic sensors, infrared sensors, radar, LIDAR and/or sonars, and/or other sensory devices.

The apparatus 130 may include one or more audio components (e.g., microphone(s) embodied within the camera (e.g., 142). Microphones may provide audio content information.

The apparatus 130 may include a sensor controller module 140. The sensor controller module 140 may be used to operate the image sensor 136. The sensor controller module 140 may receive image or video input from the image sensor 136; audio information from one or more microphones, such as 142. In some implementations, audio information may be encoded using audio coding format, e.g., AAC, AC3, MP3, linear PCM, MPEG-H and or other audio coding format (audio codec). In one or more implementations of spherical video and/or audio, the audio codec may comprise a 3-dimensional audio codec, e.g., Ambisonics such as described at http://www.ambisonic.net/ and/or http://www.digitalbrainstorming.ch/db_data/eve/ambisonics/text01.pdf, the foregoing being incorporated herein by reference in its entirety.

The apparatus 130 may include one or more metadata modules embodied (e.g., 144) within the camera housing and/or disposed externally to the camera. The processor 132 may interface to the sensor controller and/or one or more metadata modules 144. Metadata module 144 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other sensors. The capture device 130 may contain one or more other metadata/telemetry sources, e.g., image sensor parameters, battery monitor, storage parameters, and/or other information related to camera operation and/or capture of content.

Metadata module 144 may obtain information related to environment of the capture device and aspect in which the content is captured. By way of a non-limiting example, an accelerometer may provide device motion information, comprising velocity and/or acceleration vectors representative of motion of the capture device 130; the gyroscope may provide orientation information describing the orientation of the device 130, the GPS sensor may provide GPS coordinates, time, identifying the location of the device 130; and the altimeter may obtain the altitude of the camera 130. In some implementations, internal metadata module 144 may be rigidly coupled to the capture device 130 housing such that any motion, orientation or change in location experienced by the device 130 is also experienced by the metadata sensors 144.

The sensor controller module 140 and/or processor 132 may be operable to synchronize various types of information received from the metadata sources. For example, timing information may be associated with the sensor data. Using the timing information metadata information may be related to content (photo/video) captured by the image sensor 136. In some implementations, the metadata capture may be decoupled from video/image capture. That is, metadata may be stored before, after, and in-between one or more video clips and/or images. In one or more implementations, the sensor controller module 140 and/or the processor 132 may perform operations on the received metadata to generate additional metadata information. For example, the microcontroller may integrate the received acceleration information to determine the velocity profile of the capture device 130 during the recording of a video. In some implementations, video information may consist of multiple frames of pixels using any applicable encoding method (e.g., H262, H.264, Cineform and/or other standard(s)).

The apparatus 130 may include electronic storage 138. The electronic storage 138 may comprise a system memory module configured to store executable computer instructions that, when executed by the processor 132, perform various camera functionalities including those described herein. The electronic storage 138 may comprise storage memory configured to store content (e.g., metadata, images, audio) captured by the apparatus.

The electronic storage 138 may include non-transitory memory configured to store configuration information and/or processing code configured to enable, e.g., video information, metadata capture and/or to produce a multimedia stream comprised of, e.g., a video track and metadata in accordance with the methodology of the present disclosure. In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the apparatus 130. The processor 132 may interface to the sensor controller module 140 in order to obtain and process sensory information for, e.g., object detection, face tracking, stereo vision, and/or other tasks.

The processor 132 may interface with the mechanical, electrical sensory, power, and user interface 146 modules via driver interfaces and/or software abstraction layers. Additional processing and memory capacity may be used to support these processes. It will be appreciated that these components may be fully controlled by the processor 132. In some implementation, one or more components may be operable by one or more other control processes (e.g., a GPS receiver may comprise a processing apparatus configured to provide position and/or motion information to the processor 132 in accordance with a given schedule (e.g., values of latitude, longitude, and elevation at 10 Hz)).

The memory and processing capacity may aid in management of processing configuration (e.g., loading, replacement), operations during a startup, and/or other operations. Consistent with the present disclosure, the various components of the system may be remotely disposed from one another, and/or aggregated. For example, one or more sensor components may be disposed distal from the capture device, e.g., such as shown and describe with respect to FIG. 1A. Multiple mechanical, sensory, or electrical units may be controlled by a learning apparatus via network/radio connectivity.

The apparatus 130 may include user interface (UI) module 146. The UI module 146 may comprise any type of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (LED), speaker, and/or other UI elements. The UI module 146 may be operable to receive user input and/or provide information to a user related to operation of the camera apparatus 130.

The apparatus 130 may include an input/output (I/O) interface module 148. The I/O interface module 148 may be configured to synchronize the capture device 130 with other cameras and/or with other external devices, such as a remote control, a second capture device 130, a smartphone, a client device 120 of FIG. 1A and/or a video server. The I/O interface module 148 may be configured to communicate information to/from various I/O components. In some implementations the I/O interface module 148 may comprise a wired and/or wireless communications interface (e.g. WiFi, Bluetooth, USB, HDMI, Wireless USB, Near Field Communication (NFC), Ethernet, a radio frequency transceiver, and/or other interfaces) configured to communicate to one or more external devices (e.g., devices 124, 122, 120 in FIG. 1A and/or metadata source). In some implementations, the I/O interface module 148 may interface with LED lights, a display, a button, a microphone, speakers, and/or other I/O components. In one or more implementations, the I/O interface module 148 may interface to energy source, e.g., battery and/or DC electrical source. The communications interface of the apparatus 130 may include one or more connections to external computerized devices to allow for, inter alia, configuration and/or management of remote devices e.g., as described above with respect to FIG. 1A and/or with respect to FIG. 2. The connections may include any of the wireless or wireline interfaces discussed above, and further may include customized or proprietary connections for specific applications. In some implementations, the communications interface may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the capture device (e.g., 110 in FIG. 1A) and a remote device (e.g., 120 in FIG. 1A).

The apparatus 130 may include a power system that may be tailored to the needs of the application of the device. For example, for a small-sized lower power action camera, a wireless power solution (e.g. battery, solar cell, inductive (contactless) power source, rectification, and/or other) may be used.

Figure 2:
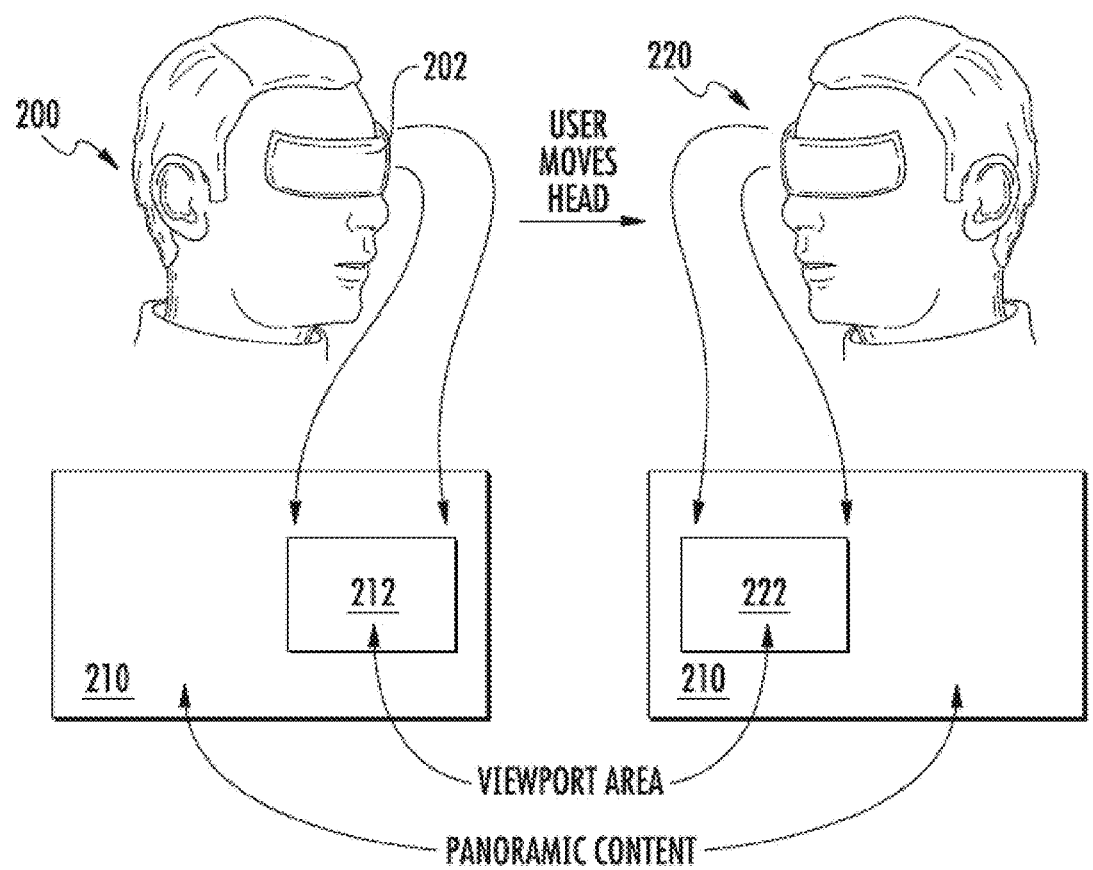
FIG. 2 is a graphical illustration depicting viewport change when viewing panoramic content in accordance with the principles of the present disclosure.

FIG. 2 illustrates viewport change when viewing panoramic content, in accordance with one implementation. In some implementations a user may view panoramic content using a virtual reality (VR) headset, 202 in FIG. 2. Headset 202 may include a sensor component configured to provide information related to orientation and/or motion of headset 202. In some implementations, the sensor component may include an accelerometer, a tilt sensor, a compass, a heading sensor, a gyroscope, and/or other sensors.

When headset 202 is pointing in a given direction, e.g., as shown in panel 200 in FIG. 2, the viewport associated with the position of headset 202 may be denoted by area 212 within the panoramic image frame 210. As used herein the terms "viewport" and/or "view area" may be used to describe a portion of view field that may be used for viewing panoramic content that may be characterized by content view field (e.g., shown by frame 210 in FIG. 2). When panoramic content is presented on a two dimensional display device, the viewport may denote a two dimensional area (e.g., 212) within the 2 dimensional projection of the acquired panoramic content (frame 210).

When providing a portion of the panoramic content (e.g., viewport 212) to a client device, a portion of the content corresponding to the present viewport may be encoded, transmitted, and/or decoded to reduce load on a content server, transmission resource (e.g., bandwidth, energy) utilization, and/or client device decoder load. Viewport changes may necessitate content bitstream adjustment. By way of an illustration, as head of the user moves from configuration 200 to configuration 220 in FIG. 2, the viewport may change, e.g., from area 212 to area 222 within the panoramic content frame 210. Accordingly, the content providing entity (e.g., content server) may need to transition from providing bitstream from content within the area 212 to content associated with the area 222.

Figure 3:
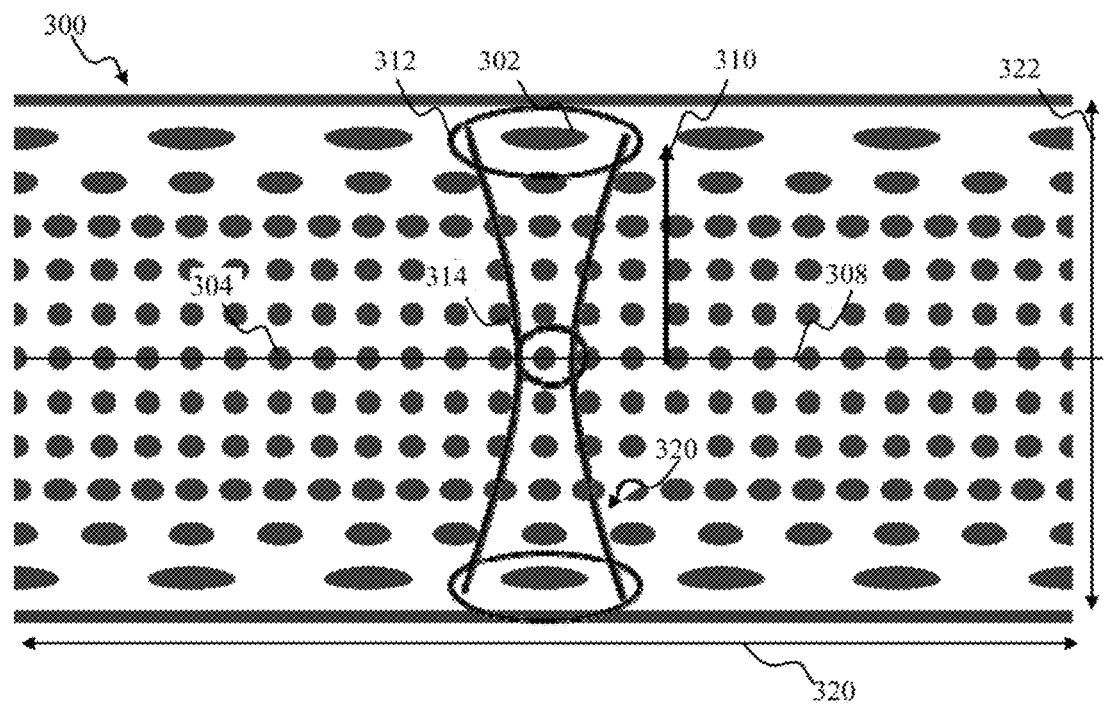
FIG. 3 is a graphical illustration depicting spatial distribution of redundant information associated with image transformation from spherical to equirectangular representation in accordance with the principles of the present disclosure.

FIG. 3 illustrates spatial distribution of redundant information associated with image transformation from spherical representation to equirectangular representation, in accordance with one implementation.

Panel 300 in FIG. 3 may be used to represent panoramic images in equirectangular coordinates characterized by longitudinal coordinate 320 and latitudinal coordinate 322. Solid filled areas in FIG. 3 (e.g., 302, 304) may denote a spatial distribution of information in a transformed image. Dimensions of the filled areas in FIG. 3 may be configured based on amount of distortion for respective portion of the image. Portions of the image proximate equator (denoted by line 308) may be characterized by uniform (with respect to direction) distortion (e.g., circular shape). As the distance from the equator increases (distance shown by arrow 310) amount of distortion may increase. It is noteworthy, as distance from the equator increases; the distortion distribution may become non-uniform with respect to direction such that distortion in longitudinal direction may exceed distortion in latitudinal direction.

Distortion map of equirectangular transformation of FIG. 3 may be used to characterize information content within the transformed image. Curves 312, 314 may describe areas within the image characterized by a given amount of information. In other words, the amount of information contained within the area encompassed by the curve 312 may be equal to amount of information contained within the area encompassed by the curve 314. As used herein, information within a given area may refer to smallest number of (independent) bits that may be used to describe pixels within the area. By way of an illustration, when transforming a spherical and/or fish-eye image into equirectangular representation, a single pixel at a location proximate to, e.g., a pole (denoted by arrow 436 in FIG. 4) may be transformed into a line in equirectangular coordinates (e.g., solid line 446 in FIG. 4). Accordingly, although multiple bits may be used to represent the line 446, amount of independent information provided by the line 446 may correspond to amount of information (e.g., color) of the pixel 436 in the spherical content.

Figure 4:
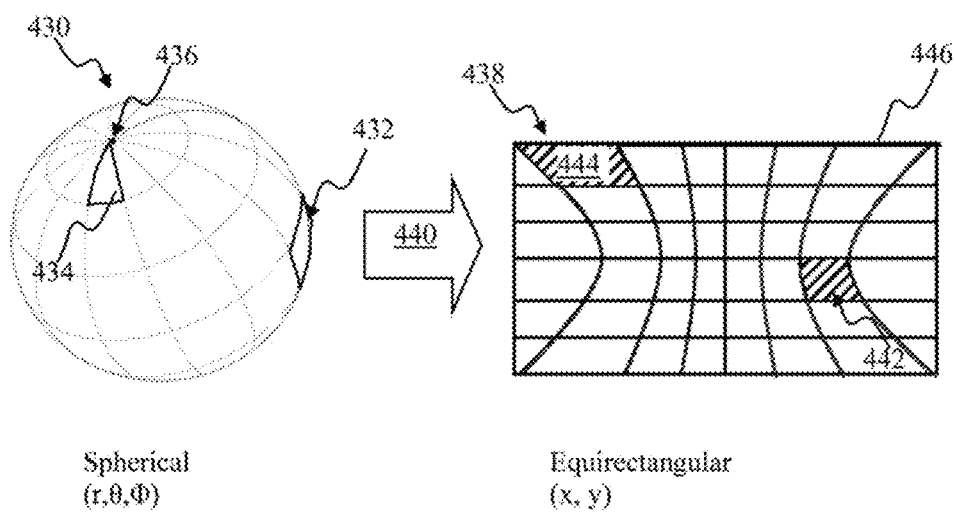
FIG. 4 is a graphical illustration depicting redundancy-based spatial mapping for processing of panoramic image content in accordance with the principles of the present disclosure.

FIG. 4 illustrates use of information mapping for processing of panoramic and/or spherical image content, in accordance with one implementation. Panel 430 in FIG. 4 illustrates spherical coordinates for characterizing panoramic content. In one or more implementations, panoramic content may be obtained using a capture device with a single lens (e.g., with field of view greater than 90° and/or fish-eye lens), a multi-lens camera apparatus, such as described in U.S. patent application Ser. No. 29/548,661, entitled "MULTI-LENS CAMERA" filed on 15 Dec. 2015, the foregoing being incorporated herein by reference in its entirety, a capture apparatus 110 of FIG. 1A, multiple cameras, and/or other capture configurations.

Panoramic content may transformed from spherical representation to equirectangular representation using transformation 440. In some implementations, the transformation 440 may include one or more or fish-eye to equirectangular transformation, spherical to equirectangular transformation, rectilinear to equirectangular transformation, cube-faced to equirectangular transformation, and/or other transformations.

Individual portion of the sphere 430 may be transformed to respective portion on equirectangular plane. Specifically, areas 432, 434 may be transformed into areas 442, 444, respectively. In some implementations, portions of a given area (e.g., two portions of spherical image occupying area of the same dimension (e.g., the same number of pixels) in spherical representation) may be transformed to equirectangular representation such that transformed portions in equirectangular representation may be characterized by different area dimension. This is illustrated in FIG. 4 by areas of portion 444 being greater than area of portion 442. For example, a single pixel 436 may be transformed into a line 446 consisting of multiple pixels.

Equirectangular mapping shown in FIG. 4 may be used to convert a spherical image in (r, θ, Φ) coordinate system to a (x,y) two-dimensional (2D) image. The transformation may stretch polar areas of the image more compared to equatorial portions of the image. The transformation may introduce a non-linear scale-based redundancy at the poles and/or non-linear warping in the combined/stitched image due to reduction in number of independent image dimensions.

Figure 5:
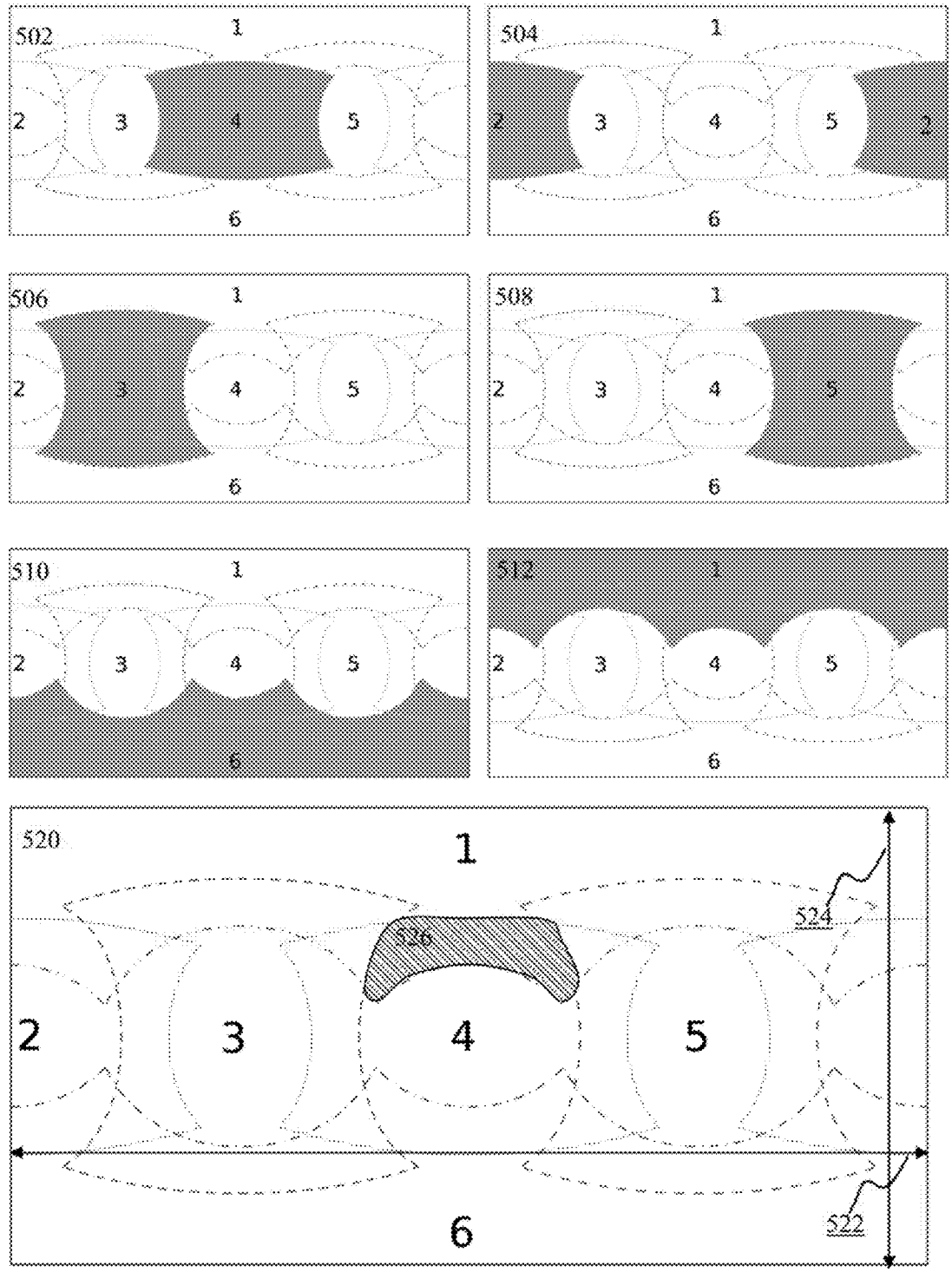
FIG. 5 is a plot depicting projection of field of view of a source camera on onto an equirectangular space in accordance with the principles of the present disclosure.

FIG. 5 illustrates projection of fields of view of multiple cameras onto equirectangular space in accordance with one implementation. Panels 502, 504, 506, 508, 510, 512 in FIG. 5 depict projections of field of views of individual cameras of, e.g., capture apparatus 110 of FIG. 1A onto an equirectangular plane. Panel 520 illustrates combined equirectangular image comprising overlapping transformed images obtained by the six cameras. For a horizontally oriented capture device 110 (e.g., (XY) plane denoted by arrows 119 in FIG. 1A disposed horizontally), notation in FIG. 5 may be expressed as follows:

- panel 502 may denote field of view 4 corresponding to a forward looking camera, e.g., camera 102 in FIG. 1A;
- panel 504 may denote field of view 2 of rearward looking camera;
- panel 506 may denote field of view 3 of leftward looking camera;
- panel 508 may denote field of view 5 of rightward looking camera, e.g., camera 104 in FIG. 1A;
- panel 510 may denote field of view 6 of downward looking camera; and
- panel 512 may denote field of view 1 of upward looking camera, e.g., 106 in FIG. 1A.

In some implementations of obtaining spherical (also referred to as 360°) image and/or video content, the combined (composite) image (e.g., occupying rectangular area of panel 520) may be characterized by greater coverage of the visual scene (wider field of view) as compared to a given component (source) image (areas denoted by broken curves and labeled by numbers 1, 2, 3, 4, 5, 6 in panel 520). By way of an illustration, forward looking camera of the apparatus 110 may be characterized by field of view labeled 4 in panel 520 and may produce a component image that may cover 120° in horizontal plane and 90° in vertical plane. The combined image shown by the rectangle 520 may cover 360°×180° sphere. Dimensions of image in panel 520 may be characterized by a ratio of two to one (e.g., dimension 522 over dimension 524 in FIG. 5). In one or more implementations one or more of the component (source) images may be characterized by one or more image characteristic configured different from one or more of other source images. By way of a non-limiting illustration, one source image (e.g., an image of a person's face) may be characterized by greater resolution compared to another source image (e.g., image of a background). It will be recognized by those skilled in the arts that various other image characteristics may be configured for individual source images, including but not limited to lens aperture, exposure value, depth of focus, color content, image sharpness, saturation, white balance, field of view, resolution, image size, lens type (e.g., fish-eye, rectilinear), and/or other parameter.

Individual cameras described with respect to FIG. 5 may be characterized by a given field of view (e.g., 120°×90°). Comparing equirectangular projections in FIG. 5, it may be concluded that some projections proximate equator (e.g., shaded area in panel 502 and/or 504) may occupy smaller area compared to area occupied by projections proximate poles (e.g., shaded areas in panels 510, 512).

Curved to equirectangular transformation (e.g., spherical to equirectangular, fish-eye to equirectangular) may introduce information redundancy within transformed image as described herein. When encoding equirectangular image, such redundancy may be taken into account so as to increase compression rate and/or reduce number of bits used for representing a given portion of encoded equirectangular image.

Figure 6A:
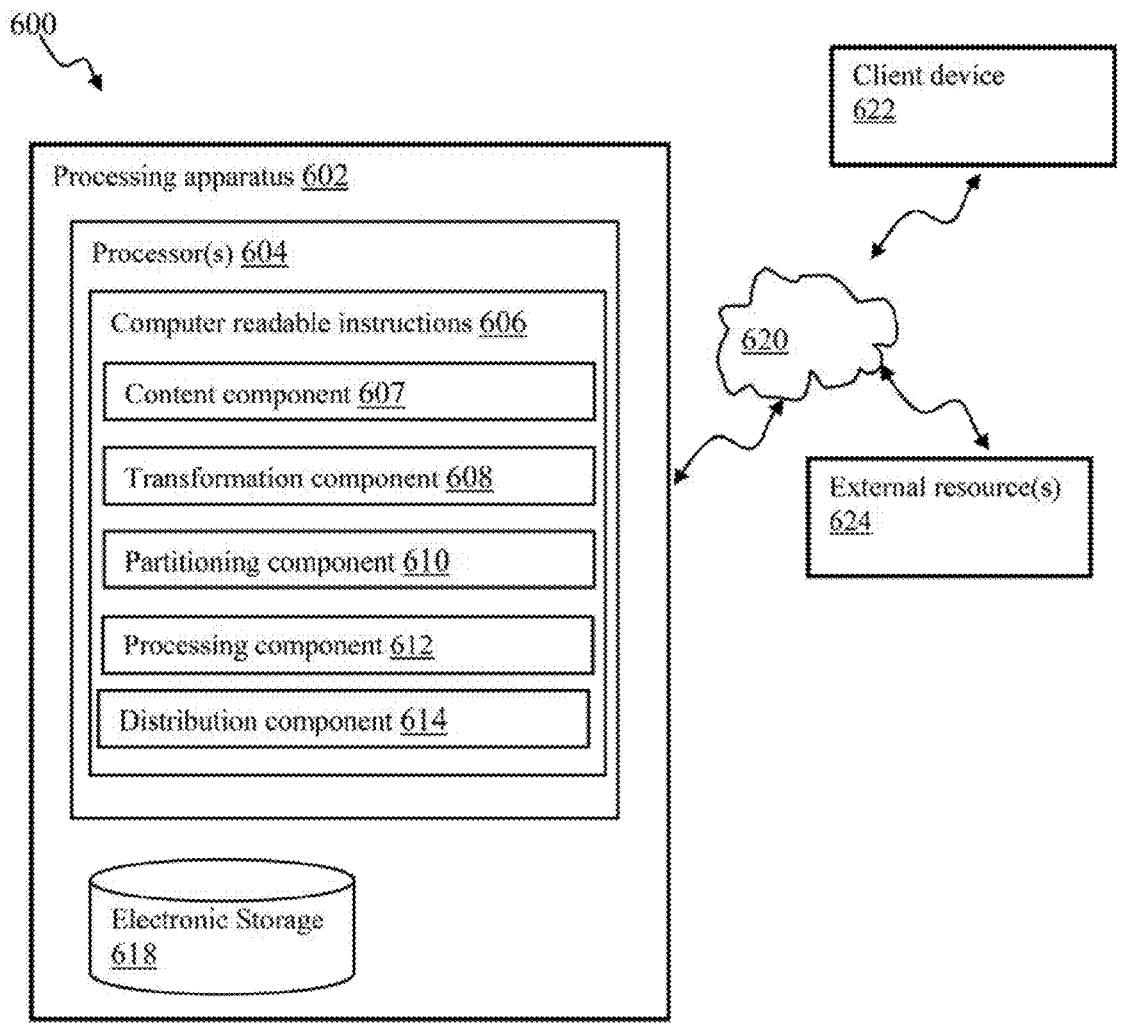
FIG. 6A is a functional block diagram illustrating a system for providing content using spatial redundancy-based mapping methodology in accordance with the principles of the present disclosure.
Figure 6B:
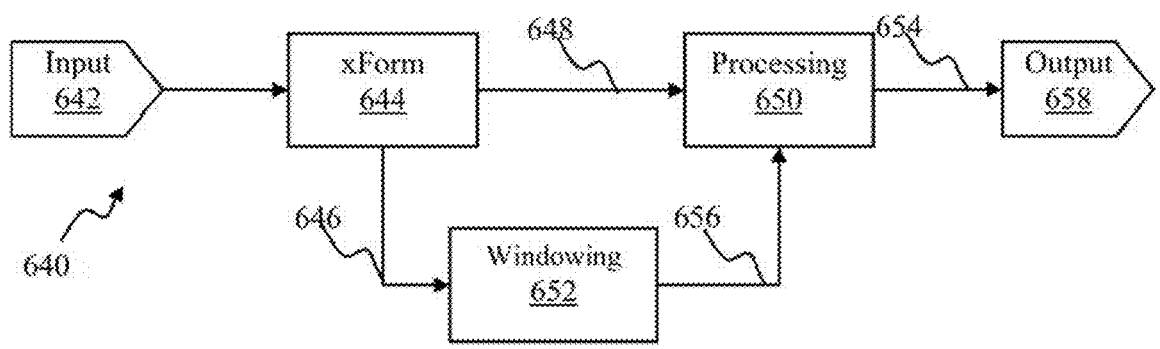
FIG. 6B illustrates an apparatus for processing panoramic content using spatial redundancy-based mapping methodology in accordance with the principles of the present disclosure.

FIG. 6B illustrates an apparatus for processing panoramic content using spatial redundancy-based mapping methodology, in accordance with one implementation. The apparatus 640 of FIG. 6B may include an image transformation component 644 configured to transform image input 642. In some implementations, the input 642 may include one or more images obtained with a capture device (e.g., images shown and described with respect to FIG. 5 obtained using capture device 110 of FIG. 1A and/or capture device 130 of FIG. 1B). The image transformation component 644 may perform stitching and projection conversion of spherical to equirectangular transformation, fish-eye to equirectangular transformation, cubic transformation, and/or other transformation operations configured to obtain panoramic image (e.g., planar image 438 in FIG. 4 and/or 520 of FIG. 5). For example, the image transformation component 644 may utilize the transformation techniques described in co-owned and co-pending U.S. patent application Ser. No. 15/289,851 filed Oct. 10, 2016 and entitled "Apparatus and Methods for the Optimal Stitch Zone Calculation of a Generated Projection of a Spherical Image", the contents of which are incorporated herein by reference in its entirety.

The transformed input 648 may be processed using an image processing pipeline operable by processing component 650. The pipeline processing may be configured to implement a variety of operations on an image.

Individual operations may include one or more of tone mapping, sharpening, noise reduction, Chroma and/or Luma sub-sampling, Chroma and/or Luma scaling, re-sampling, vignette compensation, edge-filtering, lens warp corrections, digital white balance and/or gain, local exposure modifications, temporal noise-filtering, and/or other operations.

In some implementations, transformed input 648 (e.g., an image) may be partitioned into two or more partitions. Image partitioning may include applying a window of a given shape and/or location. Windowing operation 652 may be configured in accordance with windowing configuration 646 of the image transformation component 644. In some implementations, image partitioning and/or windowing may be configured based on spatial redundancy characteristic of the image transformation component 644. By way of an illustration, windowing component 652 may receive information 646 characterizing transformation by the image transformation component 644 (e.g., equirectangular to fish-eye). Windowing information may characterize one or more non-rectangular windows, e.g., such as shown by grid pattern 438 in FIG. 4. The shape and size of the windows may be dependent on distortion produced by the image transformation component 644. Individual windows, e.g., 442, 444 may be configured based on amount of data redundancy (e.g., redundant pixels) associated with a given window location and/or size. By way of an illustration of spherical to equirectangular transformation, windows proximate equator may be characterized by lower data redundancy compared to windows disposed distant from the equator. Accordingly, windows proximate equator may be configured to have smaller area compared to area of windows disposed distant from the equator. In some implementations, the information 646 may include an index of a look up table (e.g., table that may include a list of applicable transformations), one or more equations characterizing the transformation, values characterizing window location and/or shape (e.g., window 442, 444 in FIG. 4), a vector or an array characterizing partitioning grid (e.g., grid of image 438 in FIG. 4), relative importance data in one window relative data in another window determined based on pixel redundancy due to transformation, the color value offsets per window, white balance variations and black level offsets per window (that are non-global), indices of the coordinates for the window dimensions, index of the look-up-table that maps spherical blocks (like in FIG. 4, 434) to transformation windows in 644, and/or other information.

Processing component 650 may be configured to implement one or more processing operations on a window by window basis. For example, an equirectangular image may be partitioned using non-rectangular grid 438 of FIG. 4. One or more processing operations may be applied to pixels of window 442 independent of processing operations applied to pixels of window 444. FIG. 6C illustrates one implementation of the image processing pipeline component 660 (e.g., 650 of the apparatus of FIG. 6B). The processing pipeline component 660 of FIG. 6C may be effectuated using software, hardware, a combination thereof. The processing pipeline component 660 may include one or more of the following operations: 662 Vignette compensation, 663 Lens warp corrections, 664 local exposure modification, 665 digital white balance and/or gain, 666 noise reduction filters, 668 global and/or local tone mapping, 670 Chroma and Luma sub-sampling and/or scaling, 672 sharpening filters, 673 noise-reduction filters, 674 edge filters, 676 temporal noise filtering (including motion compensated), 678 determination of input parameters (e.g., macroblock size, QB, deblocking filter, and/or other parameter) for the compression engine.

Processed input may be provided as output 658 to a target destination, e.g., display component, electronic storage, wireless communications, link, and/or other destination.

FIG. 6A illustrates a computerized system for providing content using spatial redundancy-based mapping methodology, in accordance with one implementation. In some implementations, the system 600 may be configured to provide encoded content during content acquisition by a capture device (e.g., 110 of FIG. 1A). In one or more implementations, the system 600 may be configured to provide the content using previously acquired content.

The system 600 of FIG. 6A may include a processing apparatus 602 (e.g., including capture device 110 of FIG. 1A, 130 of FIG. 1B, a computing device in communications with a capture device and/or content depository, a cloud computing apparatus, a capture device (e.g., 110 of FIG. 1A), and/or other apparatus configured to obtain and/or manipulate audio and/or imaging content, e.g., video and/or photos. Content depository may include a network attached storage (NAS), a portable storage (e.g., flash memory), a cloud storage, a server, a personal computer, a DVR, and/or other storage configuration.

The processing apparatus 602 may be in operable communication with one or more remote client devices 622 via one or more electronic communications interface 620. The electronic communications interface 620 may include one or more wired interfaces (e.g., serial, USB, Thunderbolt™, HDMI, Ethernet, and/or other wired interfaces) and/or wireless interfaces (e.g., WiFi, Bluetooth, cellular, and/or other interfaces). For example, such electronic communication links may be established, at least in part, via one or more networks. In some implementations, a network may comprise the Internet and/or may employ other communications technologies and/or protocols. By way of non-limiting example, the electronic communications interface 620 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, electronic communications interface 620 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the electronic communications interface 620 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 600 may use custom and/or dedicated data communications technologies instead of, or in addition to, the ones described above.

The remote device 622 may include a user interface device, one or more of a portable communications device (e.g., smartphone, a digital camera, a laptop, a tablet computer, a desktop computer, a television set-top box, smart TV, a gaming console, a client computing platform, and/or other platforms), a capture device (e.g., a camera), and/or other device configured to communicate information with the processing apparatus 602. In some implementations, the system 600 may include multiple capture devices, e.g., configured for obtaining panoramic content e.g., such as described in U.S. patent application Ser. No. 14/927,343 entitled "APPARATUS AND METHODS FOR ROLLING SHUTTER COMPENSATION FOR MULTI-CAMERA SYSTEMS" filed on 29 Oct. 2015, incorporated supra.

The processing apparatus 602 may include one or more physical processors 604 configured by machine-readable instructions 606 and/or other components. Executing the machine-readable instructions 606 may cause the one or more physical processors 604 to effectuate encoding of content using methodology of the disclosure. The machine-readable instructions 606 may include one or more of content component 607, an image transformation component 608, an image partitioning component 610, a processing component 612, a distribution component 614, and/or other components.

One or more features and/or functions of the processing apparatus 602 may be facilitation of video content acquisition, generation and/or provision of content. It is noted that although the present disclosure is directed to videos and/or video clips, one or more other implementations of system 600 and/or processing apparatus 602 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The processing apparatus 602 may include communication lines or ports to enable the exchange of information with a network and/or other entities. Illustration of processing apparatus 602 in FIG. 6A is not intended to be limiting. The processing apparatus 602 may include a plurality of hardware, software, and/or firmware components operating together to provide the functionality attributed herein to processing apparatus 602. For example, the processing apparatus 602 may be implemented by a cloud of computing platforms operating together as processing apparatus 602.

The processing apparatus 602 may include electronic storage 618. Electronic storage 618 may comprise electronic storage media that electronically stores information. The electronic storage media of electronic storage 618 may include one or both of system storage that is provided integrally (i.e., substantially non-removable) with processing apparatus 602 and/or removable storage that is removably connectable to processing apparatus 602 via, for example, a port or a drive. A port may include a USB port, a Firewire port, and/or other port. A drive may include a disk drive and/or other drive. Electronic storage 618 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 618 may include one or more virtual storage resources (e.g., cloud storage, a virtual private network, and/or other virtual storage resources). The electronic storage 618 may be configured to store software algorithms, information determined by processor(s) 604, information received from processing apparatus 602, information received from external resource(s), and/or other information that enables processing apparatus 602 to function as described herein.

The system 600 may include an external resource(s) 624 operatively linked via one or more electronic communication links 620. External resource(s) 624 may include sources of information, hosts, and/or other entities outside of system 600, external entities participating with system 600, computing platforms, and/or other resources. In some implementations, some or all of the functionality attributed herein to external resource(s) 624 may be provided by resources included in system 600.

It will be appreciated that this is not intended to be limiting and that the scope of this disclosure includes implementations in which processing apparatus 602, external resource(s) 624, and/or other entities may be operatively linked via some other communication media.

Processor(s) 604 may be configured to provide information-processing capabilities in processing apparatus 602. As such, processor 604 may include one or more of a digital processor, an analog processor, a digital circuit designed to process information, an analog circuit designed to process information, a state machine, and/or other mechanisms for electronically processing information. Although processor 604 is shown in FIG. 6A as a single entity, this is for illustrative purposes only. In some implementations, processor 604 may include one or more processing units. These processing units may be physically located within a given device; the processor 604 may represent processing functionality of a plurality of devices operating in coordination. The processor 604 may be configured to execute components 607, 608, 610, 612, and/or 614. Processor 604 may be configured to execute components 607, 608, 610, 612, and/or 614 by software; hardware; firmware; some combination of software, hardware, and/or firmware; and/or other mechanisms for configuring processing capabilities on processor 604.

It should be appreciated that although components 607, 608, 610, 612, and/or 614 are illustrated in FIG. 6A as being co-located within a single processing unit, in implementations in which processor 604 includes multiple processing units, one or more of components 607, 608, 610, 612, and/or 614 may be located remotely from the other components. The description of the functionality provided by the different 607, 608, 610, 612, and/or 614 described above is for illustrative purposes and is not intended to be limiting, as any of components 607, 608, 610, 612, and/or 614 may provide more or less functionality than is described. For example, one or more of components 607, 608, 610, 612, and/or 614 may be eliminated, and some or all of its functionality may be provided by other ones of components 607, 608, 610, 612, and/or 614 and/or other components. As an example, processor 604 may be configured to execute one or more additional components that may perform some or all of the functionality attributed below to one of components 607, 608, 610, 612, and/or 614.

In FIG. 6A, the content component 607 may be configured to access and/or manage image and/or audio content. In some implementations, the content component 607 may be configured to effectuate image/audio content acquisition using any applicable methodologies including those described herein. By way of an illustration, the content component 607 may be operable to instantiate content acquisition by the capture device 110 based on a timer event, user instruction, or a sensor event; the content component 607 may be operable effectuate image acquisition by the image sensor 136 of FIG. 1B. In one or more implementations, the content component 607 may be operable effectuate content acquisition by a VR headset, e.g., such as shown in FIG. 2. In some implementations, the content component 607 may be operable to access previously acquired content from, e.g., electronic storage 618 and/or external resource (e.g., external storage, and/or remote user device during content upload). The operations performed by the content component 607 may include information timestamping, cropping, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on 22 Oct. 2015, incorporated supra, and/or in a session container (e.g., such as described in detail in U.S. patent application Ser. No. 15/001,038, entitled "METADATA CAPTURE APPARATUS AND METHODS" filed on 19 Jan. 2016, the foregoing being incorporated herein by reference in its entirety).

In FIG. 6A image transformation component 608 may be configured to effectuate transformation of one or more source images of the content. In some implementations, the image transformation may include applying lens-specific to target specific transformation (e.g., fish-eye to equirectangular, fish-eye to cube and/or other transformations). In one implementation, the image transformation component 607 may be configured to obtain image of panel 520 based on source images 502, 504, 506, 508, 510, 512 of FIG. 5.

In FIG. 6A, partitioning component 610 may be configured to effectuate partitioning (windowing) of the transformed image. The partitioning may be configured in accordance with configuration of the transformation performed by the image transformation component 608. In some implementations, image partitioning and/or windowing may be configured based on spatial redundancy characteristic of the transformation.

In FIG. 6A, processing component 612 may be configured to apply one or more image processing operations to a partition of an image. In some implementations, the processing may include one or more of tone mapping, sharpening, noise reduction, Chroma and/or Luma sub-sampling, Chroma and/or Luma scaling, re-sampling, vignette compensation, edge-filtering, lens warp corrections, digital white balance and/or gain, local exposure modifications, temporal noise-filtering with or without motion compensation, determination of input parameters for the compression engine, and/or other operations.

In FIG. 6A, a distribution component 614, may be configured to provide the content. The content provision may include storing the content on the electronic storage component 618, broadcasting content, providing content to a client device for viewing and/or storage, and/or otherwise delivering content to one or more client devices (e.g., the remote device 622 (e.g., smartphone) and/or external resource (e.g., cloud storage)), and/or other operations.

Figure 7:
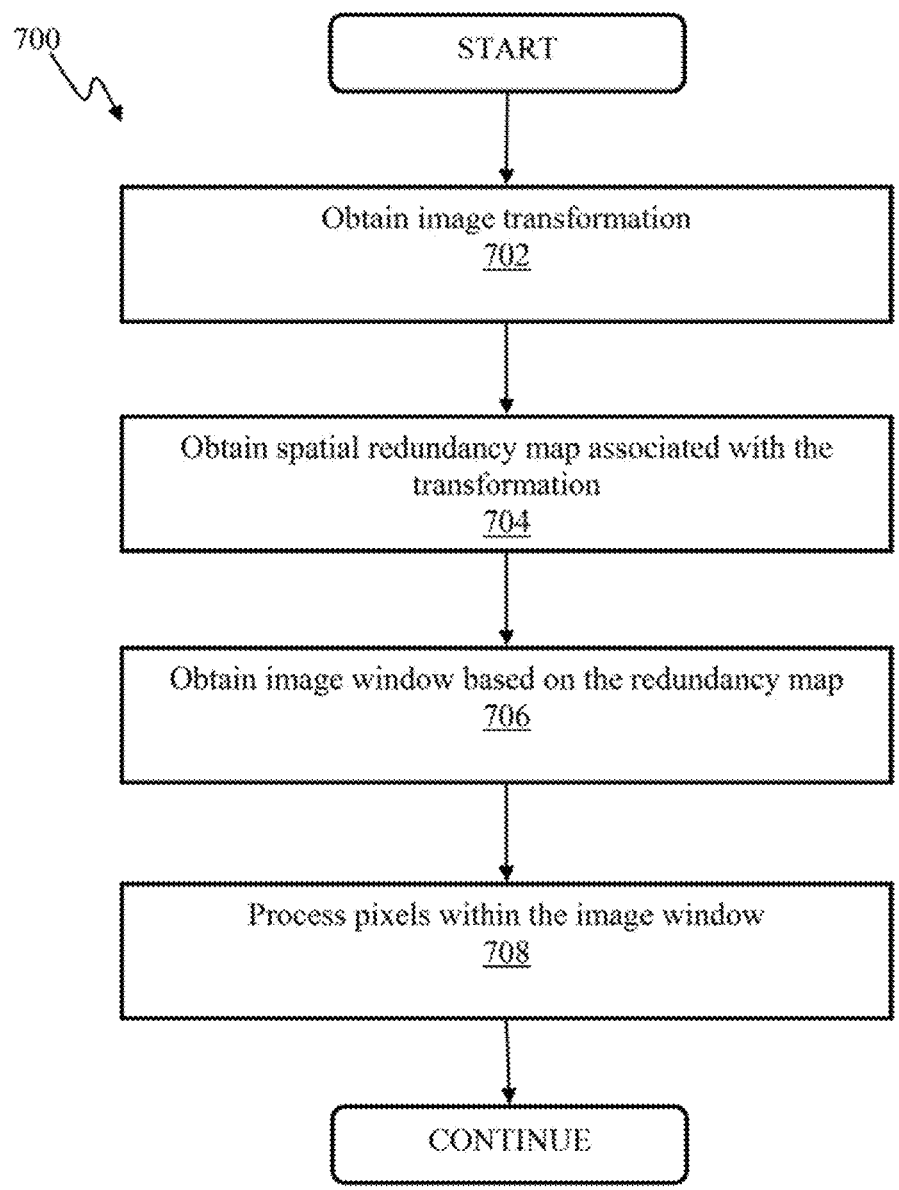
FIG. 7 is logical flow diagram illustrating a method of image processing using spatial redundancy-based mapping in accordance with the principles of the present disclosure.

FIG. 7 illustrates method 700 for processing imaging content in accordance with some implementations of the present disclosure. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700. Operations of method 700 may be effectuated by one or more devices, apparatus, and/or computerized systems including these described with respect to FIGS. 1A-1B and/or FIGS. 6A-6B.

FIG. 7 illustrates a method of image processing using spatial redundancy-based mapping in accordance with one implementation of the present disclosure. Method 700 of FIG. 7 may be implemented by, e.g., system 600 of FIG. 6A.

At operation 702 of method 700, image transformation may be obtained. In some implementations, the image transformation may include applying lens-specific (e.g., natively captured images) to target specific transformation (e.g., fish-eye (e.g., spherical) to equirectangular, fish-eye to cubic, fish-eye to octahedron, fish-eye to tetrahedron, fish-eye to dodecahedron, fish-eye to icosahedron and/or other transformations). For example, the present disclosure may utilize the transformation techniques described in co-owned and co-pending U.S. patent application Ser. No. 15/289,851 filed Oct. 10, 2016 and entitled "Apparatus and Methods for the Optimal Stitch Zone Calculation of a Generated Projection of a Spherical Image", the contents of which are incorporated herein by reference in its entirety. In one implementation, the image transformation component 608 may be configured to obtain image of panel 520 based on source images 502, 504, 506, 508, 510, 512 of FIG. 5.

At operation 704 of method 700, spatial redundancy map associated with the transformation may be obtained. In some implementations, the spatial redundancy map may be configured based on spatial distortion characteristic of the transformation. The distortion characteristic may include ellipse of distortion and/or the Tissot indicatrices, such as shown by solid shapes in FIG. 3. In some implementations, redundancy may be configured based on the transformation distortion such that greater distortion may cause greater redundancy.

At operation 706, image window based on the redundancy map may be obtained. The window operation may include selecting pixels of the transformed image in accordance with the window size and/or position. In some implementations, window may correspond to a mask used for segmenting an image. Window location and/or size may be configured based on the redundancy distribution. By way of an illustration of spherical to equirectangular transformation, image windowing operation may be configured to produce smaller window at a location (e.g., 442 proximate image equator (e.g., line 308 in FIG. 3) due to lower amount of distortion compared to locations distant from the equator (e.g. location 444).

At operation 708, pixels within the image window may be processed. In some implementations, the processing may include one or more of tone mapping, sharpening, noise reduction, Chroma and/or Luma sub-sampling, Chroma and/or Luma scaling, re-sampling, vignette compensation, edge-filtering, lens warp corrections, digital white balance and/or gain, local exposure modifications, temporal noise-filtering, and/or other operations.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", "link", "wireless connection" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A system for processing panoramic images, the system comprising:
   an electronic storage configured to store a plurality of source images; and
   one or more physical processors configured to execute a plurality of computer readable instructions, the plurality of computer readable instructions when executed by the one or more physical processors is configured to:
   transform one or more of the source images from a source representation to a target representation to obtain a transformed image;
   obtain a spatial information redundancy distribution associated with the transformation from the source representation to the target representation;
   obtain an image partition map based on the spatial information redundancy distribution, the image partition map including a first window and a second window;
   select first pixels of the transformed image corresponding to the first window; and
   apply at least one pixel manipulation operation configured to modify a value of one or more pixels of the first pixels based on an evaluation of the first pixels of the transformed image corresponding to the first window;
   wherein dimensions of the first window are different from dimensions of the second window so that an area of the first window exceeds an area of the second window.

2. The system of claim 1, wherein the source representation comprises a lens-specific natively captured representation.

3. The system of claim 2, wherein the transformed image comprises an equirectangular projection.

4. The system of claim 3, wherein the spatial information redundancy distribution is configured based on a spatial distortion characteristic of the transformation.

5. The system of claim 4, wherein the plurality of computer readable instructions when executed by the one or more physical processors is further configured to:
   select second pixels of the transformed image corresponding to the second window; and
   apply at least one pixel manipulation operation configured to modify a value of one or more pixels of the second pixels based on an evaluation of the second pixels of the transformed image corresponding to the second window.

6. The system of claim 5, wherein the plurality of computer readable instructions when executed by the one or more physical processors is further configured to apply the at least one pixel manipulation operation on a window by window basis, such that the at least one pixel manipulation operation is performed on the first window independently from the at least one pixel manipulation operation performed on the second window.

7. The system of claim 6, wherein the plurality of computer readable instructions when executed by the one or more physical processors is further configured to:
generate a processed image based at least in part on the applied at least one pixel manipulation operation; and
store the processed image in the electronic storage.

8. The system of claim 7, wherein the plurality of computer readable instructions when executed by the one or more physical processors is further configured to transmit the stored processed image to a target destination.

9. The system of claim 8, wherein the applied at least one pixel manipulation operation is selected from the group consisting of: a Vignetted compensation, a lens warp correction, a local exposure modification, a digital white balance and/or gain operation, a noise reduction filter operation, a global and/or local tone mapping operation, a Chroma and Luma sub-sampling and/or scaling operation, a sharpening filter operation, a noise-reduction filter operation, an edge filter operation, a temporal noise filtering operation, and a determination of input parameters for a compression engine.

10. A method for processing panoramic images, the method comprising:
transforming one or more source images from a source representation to a target representation in order to obtain a transformed image;
obtaining a spatial information redundancy distribution associated with the transformation from the source representation to the target representation;
obtaining an image partition map based on the spatial information redundancy distribution, the image partition map comprising a first window of the transformed image;
selecting first pixels of the transformed image corresponding to the first window; and
applying at least one pixel manipulation operation configured to modify a value of one or more pixels of the first pixels based on an evaluation of the first pixels of the transformed image corresponding to the first window.

11. The method of claim 10, further comprising:
selecting second pixels of the transformed image corresponding to a second window of the transformed image, the second window differing in size from the first window; and
applying at least one pixel manipulation operation configured to modify a value of one or more pixels of the second pixels based on an evaluation of the second pixels of the transformed image corresponding to the second window.

12. The method of claim 11, further comprising applying the at least one pixel manipulation operation on a window by window basis, such that the at least one pixel manipulation operation is performed on the first window independently from the at least one pixel manipulation operation performed on the second window.

13. The method of claim 12, further comprising:
generating a processed image based at least in part on the applied at least one pixel manipulation operation; and
storing the processed image in an electronic storage.

14. The method of claim 13, further comprising transmitting the stored processed image to a target destination.

15. A computerized apparatus for processing panoramic content, the computerized apparatus comprising:
a network interface configured to receive a plurality of source images;
an image transformation component configured to transform one or more of the source images from a source representation to a target representation in order to obtain a transformed image;
a windowing component configured to receive a spatial information redundancy distribution from the image transformation component, the spatial information redundancy distribution associated with the transformation from the source representation to the target representation;
the windowing component further configured to generate a plurality of windows for the transformed image, the generated windows being based at least in part on the spatial information redundancy distribution; and
a processing component configured to apply one or more processing operations on the transformed image on a window by window basis of the plurality of generated windows.

16. The computerized apparatus of claim 15, wherein the processing component is further configured to select first pixels of the transformed image corresponding to the first window; and
apply at least one pixel manipulation operation so as to modify a value of one or more pixels of the first pixels based on an evaluation of the first pixels of the transformed image corresponding to the first window.

17. The computerized apparatus of claim 16, wherein the applied at least one pixel manipulation operation is selected from the group consisting of: a Vignetted compensation, a lens warp correction, a local exposure modification, a digital white balance and/or gain operation, a noise reduction filter operation, a global and/or local tone mapping operation, a Chroma and Luma sub-sampling and/or scaling operation, a sharpening filter operation, a noise-reduction filter operation, an edge filter operation, a temporal noise filtering operation, and a determination of input parameters for a compression engine.

18. The computerized apparatus of claim 15, wherein the source representation comprises a lens-specific natively captured representation and the target representation comprises an equirectangular projection.

19. The computerized apparatus of claim 18, wherein the spatial information redundancy distribution is configured based on a spatial distortion characteristic associated with the transformation of the one or more of the source images from the source representation to the target representation.

20. The computerized apparatus of claim 15, wherein the processing component is further configured to:
generate a processed image based at least in part on the applied one or more processing operations on the transformed image; and
transmit the processed image to a target destination.

* * * * *